UNITED STATES PATENT OFFICE.

HAROLD HIBBERT, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PROCESS OF CONDENSATION.

1,164,647.

Specification of Letters Patent.

Patented Dec. 21, 1915.

No Drawing.

Application filed August 13, 1913. Serial No. 784,483.

*To all whom it may concern:*

Be it known that I, HAROLD HIBBERT, of Wilmington, in the county of New Castle, and in the State of Delaware, have invented a certain new and useful Improvement in Processes of Condensation, and do hereby declare that the following is a full, clear, and exact description thereof.

My invention has relation especially to condensation by the use of iodin, although it is capable of application to processes of condensation in other ways. Hitherto, similar condensations have been carried out in various ways, all of which have been more or less unsatisfactory both from the standpoint of the purity of the product, the yields obtained, and also from the standpoint of cost. For example, concentrated sulfuric acid has been used for this purpose, but its use is almost invariably accompanied by the formation of by-products such as oxids, and its use, furthermore, often results in producing reduction products of the sulfuric acid such as sulfur dioxid. By means of my process I am enabled to overcome all, or practically all, of these disadvantages.

The object of my invention is particularly to provide an improved process for condensation. It, however, relates especially to a process for producing condensation by the use of iodin, so as to effect an intramolecular condensation. It will thus be seen that one object of my invention is directed particularly to the condensation carried out within a single molecule of a compound.

A further object of my invention is to produce condensations of this general character in a more advantageous manner, such as by the use of a vacuum or partial vacuum.

My invention has special reference to the production of condensations by the splitting off of water from a molecule of a carbon compound, particularly in compounds containing one or more hydroxyl groups. My invention has special reference, furthermore, to an improvement in condensations by the use of a vacuum or partial vacuum.

My invention may be carried out in an exceedingly simple manner merely by the use of a small quantity of iodin. My invention is capable of being carried out in many different ways as indicated by the foregoing statements in regard to my invention, but for the purposes of illustration I shall refer to certain examples indicating different ways in which my invention may be carried out if desired.

For example, I may distil diacetone alcohol with 1/10,000 of its weight of iodin over a free flame. The distillation results in the production of practically a quantitative yield of mesityl oxid.

As another example of my invention, I may distil pinacone with about 1/500 of its weight of iodin. The distillation may be carried out solely over a naked flame and using a fractionating column with glass beads. In this manner an excellent yield of dimethyl butadiene is obtained, having a boiling point of 70 to 73° C.

As another example of my invention, I may distil cyclohexanol with about 1/50 of its weight of iodin at a temperature around 170 to 175° C. for about sixty hours. The distillate separates into two layers, a lower aqueous layer and an upper layer of tetrahydrobenzene. The tetrahydrobenzene may be dried with calcium chlorid and is found to have a boiling point at 82 to 84° C. It will be found that the product remaining in the distilling flask represents unchanged cyclohexanol. It will be seen that in all of these examples the presence of a small amount of iodin has exerted a remarkable action in bringing about an intramolecular condensation of carbon compounds, the reaction being apparently a general one. The action is practically such as to bring about a condensation of carbon compounds containing one or more hydroxyl groups.

I have found that any or all of these processes and processes of the same general character may be facilitated by the use of a vacuum or partial vacuum, and that more efficient results can be obtained by carrying out the processes in this manner.

While I have described my invention above in detail, I wish it to be understood that many changes may be made therein without departing from the spirit of my invention.

I claim:

1. A process which comprises forming an unsaturated condensation product by condensing intramolecularly an alcohol in which the hydroxyl group is linked to a carbon atom, linked to not more than one hydrogen atom, by the action thereon of iodin under the influence of heat.

2. A process which comprises forming an unsaturated condensation product by condensing intramolecularly an alcohol in which the hydroxyl group is linked to a carbon atom, linked to not more than one hydrogen atom, by the action thereon of a small quantity of iodin under the influence of heat.

3. A process which comprises forming an unsaturated condensation product by condensing intramolecularly a ketone alcohol by the action thereon of iodin under the influence of heat.

4. A process which comprises forming an unsaturated condensation product by condensing intramolecularly a ketone alcohol by the action thereon of a small quantity of iodin under the influence of heat.

5. A process which comprises forming mesityl oxid by condensing intramolecularly diacetone alcohol by the action thereon of iodin under the influence of heat.

6. A process which comprises condensing intramolecularly an alcohol in which the hydroxyl group is linked to a carbon atom, linked to not more than one hydrogen atom, by the action thereon of iodin in a partial vacuum under the influence of heat.

7. A process which comprises forming an unsaturated condensation product by condensing intramolecularly an alcohol in which the hydroxyl group is linked to a carbon atom, linked to not more than one hydrogen atom, by the action thereon of a small quantity of iodin in a partial vacuum under the influence of heat.

8. A process which comprises condensing intramolecularly an alcohol in which the hydroxyl group is linked to a carbon atom, linked to not more than one hydrogen atom, by the action thereon of iodin under the influence of heat.

9. A process which comprises condensing intramolecularly a ketone alcohol by the action thereon of iodin under the influence of heat.

10. A process which comprises forming an unsaturated condensation product by condensing intramolecularly an alcohol in which the hydroxyl group is linked to a carbon atom, linked to not more than one hydrogen atom, by the action thereon of iodin under the influence of heat in a partial vacuum.

In testimony that I claim the foregoing I have hereunto set my hand.

HAROLD HIBBERT.

Witnesses:
W. H. D. MARR,
JAS. B. DEAL.